No. 699,038. Patented Apr. 29, 1902.
B. THOENS.
MULTIPLE EFFECT.
(Application filed Apr. 27, 1901.)
(No Model.)

WITNESS: Clarence A. Bateman, Percy C. Bowen

INVENTOR Burchard Thoens

UNITED STATES PATENT OFFICE.

BURCHARD THOENS, OF NEW ORLEANS, LOUISIANA.

MULTIPLE EFFECT.

SPECIFICATION forming part of Letters Patent No. 699,038, dated April 29, 1902.

Application filed April 27, 1901. Serial No. 57,812. (No model.)

*To all whom it may concern:*

Be it known that I, BURCHARD THOENS, a subject of the Emperor of Germany, residing at New Orleans, in the parish of Orleans and State of Louisiana, have invented certain new and useful Improvements in Multiple Effects; and I do hereby declare the following to be a full, clear, and exact description of the invention, such as will enable others skilled in the art to which it appertains to make and use the same.

My invention relates to improvements in multiple effects for the evaporation or concentration of liquids or solutions in which the vapor of each preceding effect is used for the further evaporation in each succeeding effect.

My invention relates more especially to apparatus used in the manufacture of sugar from either cane-juice or beets.

The present effects generally consist of a number of vacuum pans or vessels placed side by side, the juice being pumped from one to the other; but in my present invention the several chambers are superposed and in a common shell, thus simplifying the apparatus and the number of pumps and other parts required and securing other advantages, which will be more readily understood after reference to the drawings, in which—

Figure 2:
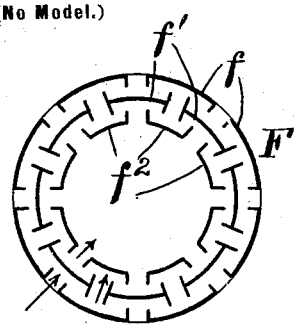
Figure 3:
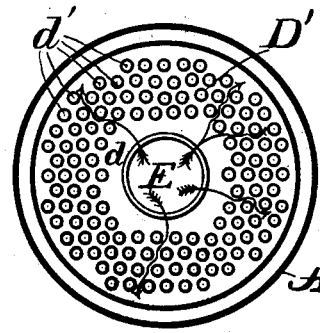
Figure 1:
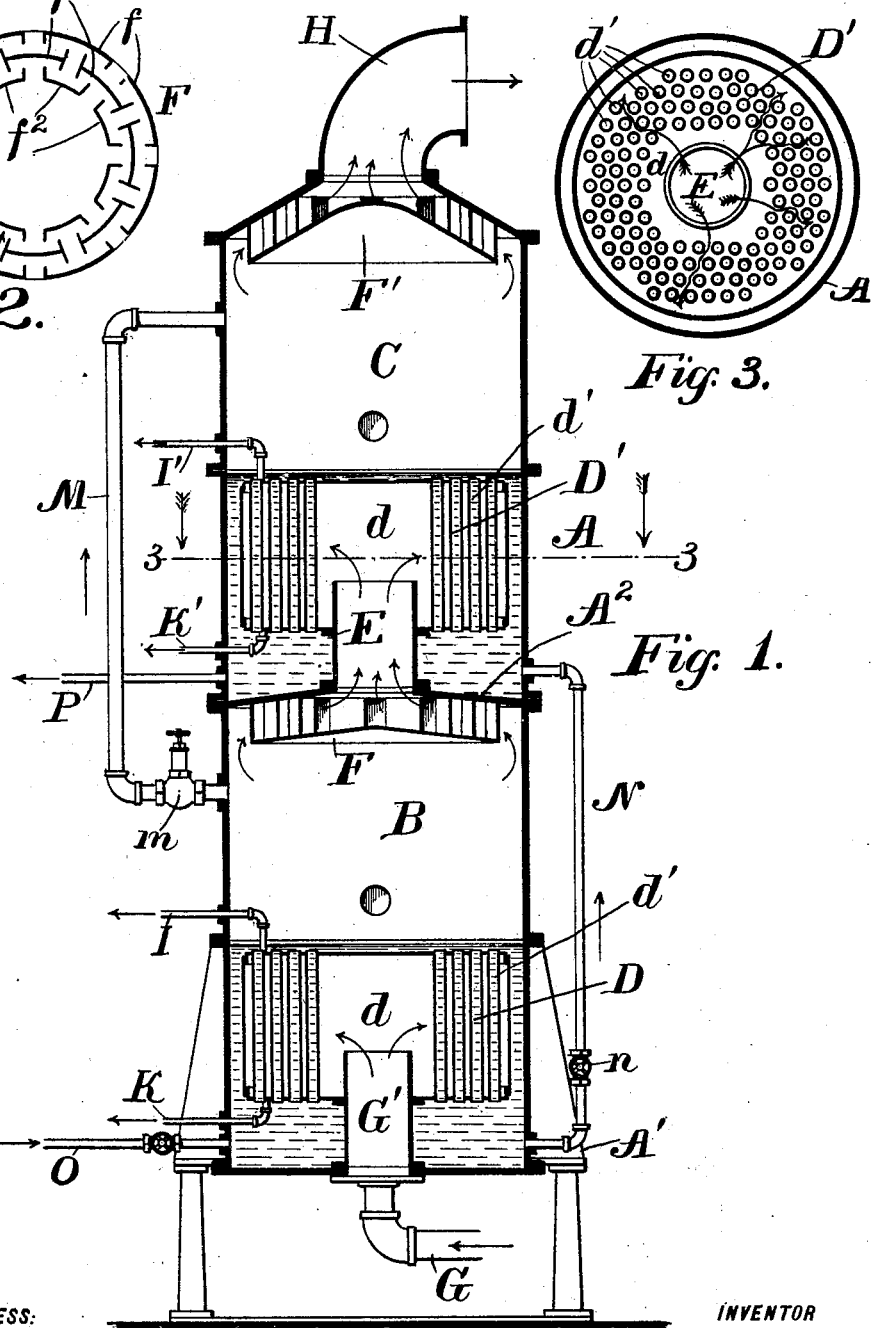

Figure 1 represents a sectional elevation of my invention as used in a double effect, and Fig. 2 represents diagrammatically the arrangement of baffle-plates to prevent the entrainment of the liquid from one evaporating-chamber to another.

A represents the shell of the evaporator, mounted on any suitable support and separated by a partition $A^2$ into the chambers B and C. In the lower portion of each chamber I provide heating-drums D and D', respectively, hollow at the center, as at $d$, and provided with groups of water-legs $d'$ for the passage therethrough of the liquid to be evaporated or concentrated. The vapor passing from the chamber B escapes through the separator F, passing through the tortuous passages between the plates $f, f'$, and $f^2$ (see Fig. 2) into the uptake E, which opens into the central portion $d$ of the drum D'. The vapor from the chamber C passes the separator F' and a similar arrangement of tortuous passages between the baffle-plates, as shown in Fig. 2, up into the vapor-pipe H, which is connected to a suitable condenser, (not shown,) and the flow of the vapor is superinduced by an air-pump (not shown) connected to the condenser, as is well known in the art. Steam either from the boilers or from the escape side of the various engines is admitted through the pipe G and flue G' to the central portion $d$ of the drum D'. The two drums D and D' have pipes I and I', respectively, for carrying off any air or other uncondensed vapor and drain-pipes K and K', respectively, all of which pipes are connected to suitable pumps, as is well known in the art. The vapor-spaces of the chambers B and C are connected by means of the pipe M, having a reducing-valve $m$ therein, and the liquid-spaces of the two chambers B and C are connected together by the pipe N, provided with an ordinary valve $n$. The fluid is introduced into the evaporator through the pipe $o$, near the bottom of the chamber B, and is carried from the evaporator through the pipe P, near the bottom of the chamber C.

The operation is as follows: The liquid to be evaporated or concentrated is introduced through the pipe O into the chamber B until it covers the heating-drum D in the said chamber. Then steam is admitted through the pipe G, heating the liquid and causing a partial evaporation of the same. The vapors rising from the liquid in the chamber B pass up through the separator F and through E into the central portion $d$ of the drum D', where it is condensed, the water of condensation and the uncondensed components of the vapor being drawn off by the pipes K' and I', respectively. In the meantime the air or vacuum pump connected to the pipe H is started, creating a partial vacuum in the chamber C, this being connected by the pipe M and reducing-valve $m$ to the chamber B. The pressure in the chamber B is reduced to a predetermined degree by the reducing-valve. This pipe M may be dispensed with ordinarily, as the required vacuum is generally maintained by the so-called "sweet-water" pump (not shown) attached to the pipe K'; but this arrangement requires a great deal of attention, and the pump has to be regulated and watched in order to keep a constant vacuum of the same degree. As an auxiliary device this pipe M is introduced, whereby the same vacuum would be maintained automatically by means of the reducing-valve and by the main vacuum-pump attached to the vapor-pipe H, but not so much as the pressure in the chamber C, and consequently fluid will be sucked up through the pipe N from B into C. If the lift is too great or pressure too small, the pipe N may be connected to a force-pump for forcing the liquid from the chamber B to the chamber C. The vapor passing from the chamber C is carried to the condenser and condensed in the usual way. It will be evident that if the elevation of the drums D and D' be high enough the water of condensation may be drained off through the pipes K and K' by gravity; but in ordinary practice it will be preferable to connect the same to a suitable pump. After the liquid has been sufficiently condensed in the chamber C it is carried off through the pipe P. Thus it will be seen that by a single air-pump connected to the pipe H a different degree of vacuum is created in the chambers B and C, and through this difference in pressure the liquid may be caused to pass from the chamber B to the chamber C without the introduction of a separate pump for that purpose. Moreover, by combining several chambers or compartments in a single shell great economy in the construction is secured, and at the same time loss of efficiency due to radiation from the apparatus is to a certain degree obviated.

The herein-described construction of heating-drums having the steam or vapor applied to the center of the drum secures greater uniformity in heating the liquid on all sides of the drum and at the same time renders it possible to conveniently get at the water-legs. Furthermore, the arrangement of separators prevents the entrainment of liquid along with the vapor from one compartment to the other and at the same time without materially impeding the flow of the vapor.

While I have shown the invention as applied to a double effect, it will be evident that additional chambers might be superposed over the chamber C to the desired number. Where more than two chambers are used, it would ordinarily be necessary to force the liquid through the pipe N and the corresponding pipes in the other chambers by means of a suitable pump.

It will be obvious that various modifications might be made in the herein-described apparatus without departing from the spirit of my invention.

Having thus described my invention, what I claim, and desire to secure by Letters Patent of the United States, is—

1. In an apparatus of the character described, the combination with an evaporator divided into a plurality of chambers with heating devices in the lower portion of each of said chambers, of a pipe connecting the lower portions of each pair of said chambers, and another pipe connecting the upper portions of each pair of said chambers, means for supplying the liquid to be concentrated to one of said chambers, and means for drawing off the vapor from another of said chambers, substantially as described.

2. A separator for use in an apparatus of the character described, comprising a base-plate and a plurality of baffle-plates $f$, $f'$ and $f^2$ projecting upward from said base-plate and arranged to form tortuous passages to permit the passage of the vapor therethrough, but to arrest any condensed liquid, the said separator being arranged in the upper portion of the evaporating-chamber, substantially as described.

3. In an apparatus of the character described, the combination with an evaporator divided into a plurality of superimposed chambers, with a heating-drum in the lower portion of each of said chambers, means for supplying the liquid to be concentrated to the lowest of said chambers, and means for drawing off the vapor from the highest of said chambers, pipes connecting adjacent chambers above and below the liquid, respectively, and a reducing-valve in the pipe connecting the chambers above the liquid, substantially as described.

4. In an apparatus of the character described, the combination with an evaporator divided into a pair of chambers with heating devices in the lower portion of each of said chambers, of a pipe connecting the lower portion of each of said chambers, and another pipe connecting the upper portions of each pair of said chambers, means for supplying the liquid to be concentrated to the lower one of said chambers, and means for drawing off the vapor from the top of the upper one of said chambers, substantially as described.

5. In an apparatus of the character described, the combination with an evaporator divided into a plurality of chambers with a heating-drum hollow in the center and provided with a series of water-legs, located in the lower portion of each of said chambers, and steam or vapor flues opening upward into the hollow central portion of said drums, of pipes connecting said chambers, with a reducing-valve in one of said pipes, means for supplying the liquid to be concentrated to one of said chambers, and means for drawing off the vapor from another of said chambers, substantially as described.

6. In an apparatus of the character described, the combination with an evaporator divided into a plurality of superimposed chambers, with a heating-drum hollow in the center and provided with a series of water-legs, located in the lower portion of each of said chambers, and steam or vapor flues opening upward into the hollow central portion of said drums, means for supplying the liquid to be concentrated to the lowest of said chambers, and means for drawing off the vapor from the highest of said chambers, pipes connecting adjacent chambers above and below
5 the liquid, respectively, and a reducing-valve in the pipe connecting the chambers above the liquid, substantially as described.

In testimony whereof I affix my signature in presence of two witnesses.

BURCHARD THOENS.

Witnesses:
   JNO. J. WARD,
   C. M. HEDO.